Dec. 16, 1969  W. HIRT  3,483,641
VEHICLE ATTACHMENT AND METHOD OF ATTACHING
THE LATTER TO A VEHICLE
Filed Sept. 12, 1967  2 Sheets-Sheet 1
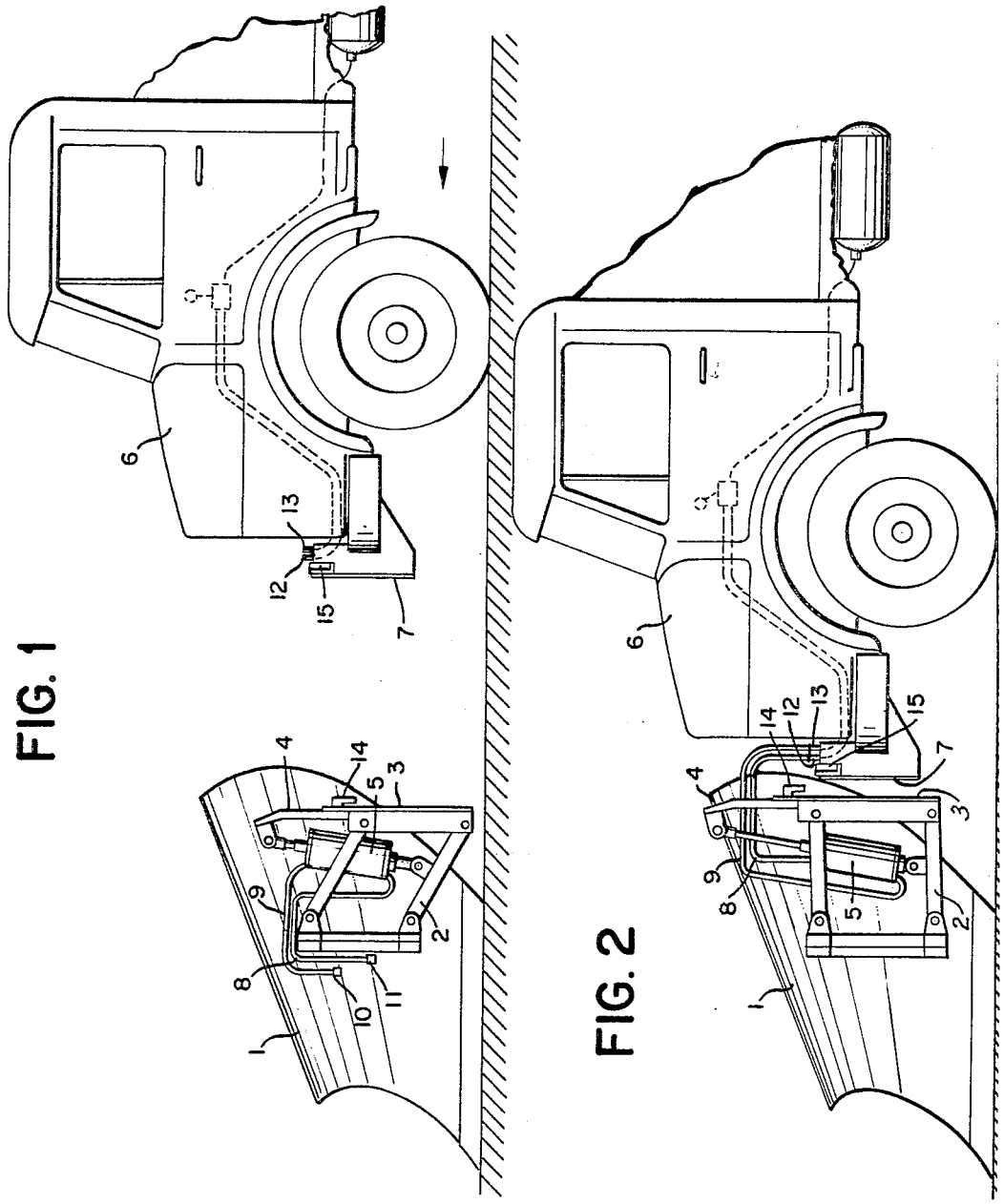
INVENTOR
WALTER HIRT
BY  *Nolte & Nolte*
ATTORNEYS Dec. 16, 1969 W. HIRT 3,483,641
VEHICLE ATTACHMENT AND METHOD OF ATTACHING
THE LATTER TO A VEHICLE
Filed Sept. 12, 1967 2 Sheets-Sheet 2

INVENTOR
WALTER HIRT

BY *Nolte & Nolte*

ATTORNEYS great # United States Patent Office 3,483,641
Patented Dec. 16, 1969

3,483,641
VEHICLE ATTACHMENT AND METHOD OF ATTACHING THE LATTER TO A VEHICLE
Walter Hirt, St. Blasien, Black Forest, Germany, assignor to Ing. Alfred Schmidt, St. Blasien, Black Forest, Germany, a firm
Filed Sept. 12, 1967, Ser. No. 667,178
Claims priority, application Germany, Nov. 18, 1966, Sch 39,832
Int. Cl. E01h 5/04
U.S. Cl. 37—44    10 Claims

ABSTRACT OF THE DISCLOSURE

A structure and method for connecting an attachment to a vehicle. The attachment, such as a snowplow, for example, is connected by a suitable guide means with a connecting means in such a way that the connecting means can be displaced in elevation with respect to the attachment and the attachment can be displaced in elevation with respect to the connecting means. A lifting means is carried by the attachment and coacts with the connecting means on the one hand to move the latter in elevation with respect to the attachment and on the other hand to move the attachment in elevation with respect to the connecting means. A support means is carried by the vehicle, and the lifting means is actuated first to raise the connecting means to an operative position with respect to the support means where the connecting means is carried thereby and then to raise the attachment with respect to the connecting means so that the attachment can be raised from the ground or the like to a selected elevation.

BACKGROUND OF THE INVENTION

The present invention relates to structures for mounting attachments on vehicles, as well as to a method for carrying out the mounting of an attachment on a vehicle.

Thus, the invention relates to devices such as quick-change devices capable of being used, for example, in connection with mounting of snowplows or the like on a suitable vehicle such as a tractor, truck, or the like. The latter vehicle carries a support plate to which the attachment is connected by a suitable connecting structure carried by the attachment.

It is already known to mount different types of attachments on suitable carrier vehicles by way of a plate which is fixed to the vehicle and a connecting plate which is carried by an attachment. Both of these plates may be provided, for example, with bores to receive fixing bolts. In this latter connection it has already been proposed to provide at one of the plates tapered projections received in suitable openings of the other plate so as to improve the centering of the plates with respect to each other when they are joined together. Such centering structure can serve, however, only to compensate for relatively small deviations from the proper positions of the plates with respect to each other. For this reason the mounting of attachments on vehicles by the use of plates of the above type requires an undesirably large amount of time and, as a minimum, a pair of operators to carry out the manipulations required in connection with the mounting of the attachment on the vehicle. The latter considerations are particularly applicable in the case where one of the plates is required to move in elevation with respect to the other plates.

In the case where an attachment is to be provided for a vertically movable loading device, it is known to provide at the ends of the loading arms a plate which has a front smooth surface and which coacts with a corresponding plate of the attachment. The plate which is carried by the attachment has claw-like projections which can extend over the plate which is carried by the loading arms. When the attachment is to be mounted on the loader, the latter is driven to a position adjacent the attachment, and the loading arms are situated beneath the connecting plate of the attachment. Then the loading arms with the plate carried by the latter are raised so that the latter plate is received beneath the claws of the plate of the attachment. Such an assembly does indeed provide a connection between the attachment and the vehicle in the case where there is a difference in elevation between the vehicle and the attachment, but it is essential for such a construction that a pair of loading arms be provided at the vehicle.

SUMMARY OF THE INVENTION

A primary object of the present invention is to avoid the above drawbacks while at the same time making it possible to mount an attachment on a vehicle in a rapid, simple manner.

In particular, it is an object of the present invention to provide a method and apparatus which make it possible to mount an attachment, such as a snowplow, on a vehicle with a construction where the connecting plate of the attachment moves in elevation with respect to the supporting plate which is carried by the vehicle.

A further object of the present invention is to provide a structure of the above type which makes it possible to carry out the mounting of the attachment on the vehicle, as well as the dismounting of the attachment from the vehicle, without requiring the use of a pair of operators for this purpose and at the same time enabling the operations to be carried out very quickly so that an undesirably long time is not involved.

Furthermore, it is an object of the present invention to provide a construction which will guarantee the proper centering of the connecting structure of the attachment with the supporting structure of the vehicle.

Yet another object of the present invention is to provide a construction of the above type which requires very little structure in addition to structure which is required in any event in connection with use of the attachment.

Also it is an object of the invention to provide a construction which requires no more than a single operator in order to carry out all of the operations.

In accordance with the invention, the vehicle carries a support means while the attachment has a connecting means which is provided for connecting the attachment to the support means. A guide means is operatively connected to the support means, this lifting means then being other hand to the connecting means to provide for movement of the latter in elevation with respect to the attachment and for movement of the attachment in elevation with respect to the connecting means. A lifting means is operatively carried by the attachment itself and is operatively connected with the connecting means first to raise the latter in elevation with respect to the attachment to an operative position with respect to the support means with the connecting means mounted on and connected to the support means, this lifting means then being operated to raise the attachment with respect to the connecting means which is in its operating position, so that in this way the attachment can be raised from the ground or the like to a selected elevation while being mounted on the vehicle.

BRIEF DESCRIPTION OF THE DRAWINGS

The invention is illustrated by way of example in the accompanying drawings which form part of this application and in which:

FIG. 1 is a schematic side elevation of one possible embodiment of a structure according to the invention, FIG. 1 also illustrating an initial stage of the method of the invention;

FIG. 2 shows a subsequent stage of the method, also in a schematic side elevation where the structure of the invention is illustrated with the parts in a position different from that shown in FIG. 1;

DESCRIPTION OF A PREFERRED EMBODIMENT

Figure 3:
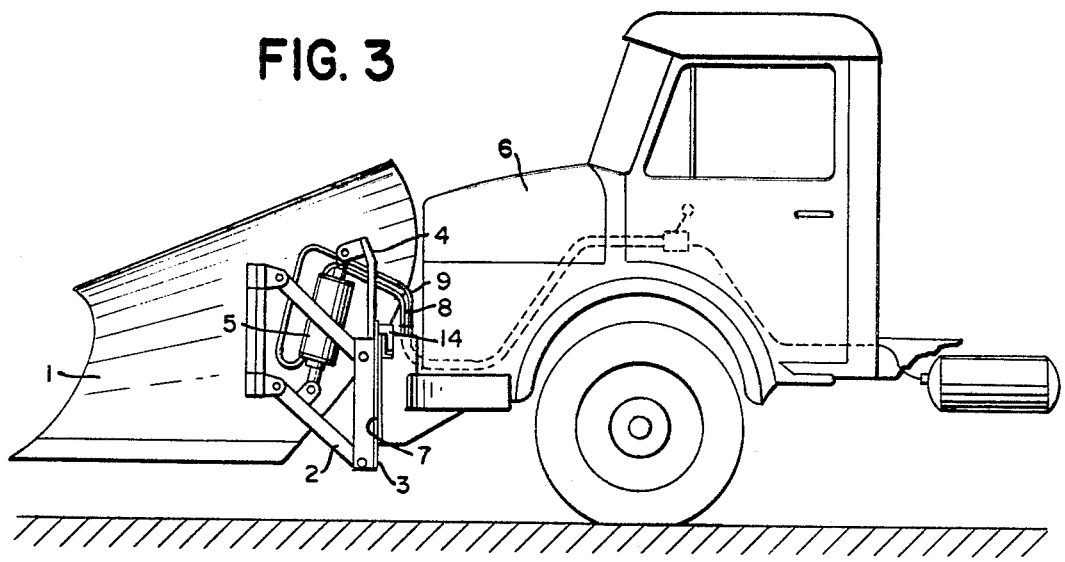
FIG. 3 shows the structure of FIGS. 1 and 2 also in a schematic manner, after the attachment has been mounted on the vehicle by the structure of the invention and according to the method of the invention.

Referring now to FIG. 1, there is schematically illustrated therein an attachment which in the illustrated example is in the form of a snowplow 1. A connecting means is operatively connected with the attachment 1 by way of a guide means 2. The connecting means 3 is in the form of a substantially rigid plate, while the guide means 2 takes the form of links of a parallelogram linkage pivotally connected to the plate 3, which forms part of the parallelogram linkage, and these links 2 are also pivotally connected to suitable brackets carried by the rear of the snowplow attachment 1.

A lifting means is provided for raising and lowering the connecting means 3 with respect to the attachment 1 and also for raising and lowering the attachment 1 with respect to the connecting means 3. In the illustrated example this lifting means is shown as a fluid-operated assembly 5, in the form of a hydraulically or pneumatically actuated cylinder and piston assembly pivotally connected at its upper end to an extension 4 which is fixed to and extends from the plate 3 and is in the form of a rigid bar, for example. The lower end of the lifting means 5 is pivotally mounted on and connected to an arm of the parallelogram linkage 2.

The cylinder of the lifting means 5 is fed with fluid under pressure by way of a fluid-circuit which includes the flexible hoses or conduits 8 or 9 respectively connected to opposed ends of the cylinder 5 in communication with the interior thereof and terminating distant from the cylinder 5 in coupling elements 10 and 11 of known construction for connecting the conduits 8 and 9 to other conduits which communicate with a source of fluid under pressure.

The vehicle 6 carries a source of fluid under pressure, such as a pressure fluid situated within the tank shown at the right of FIGS. 1-3, and through a suitable conduit this tank is connected to a control accessible to the operator in the cab of the vehicle 6.

The vehicle 6 is shown in FIG. 1 at a distance from the attachment 1 while approaching the latter, as shown by the arrow at the lower right of FIG. 1. At its front end of the vehicle 6 carries a support means 7, in the form of a rigid plate which is fixedly carried by the vehicle in any suitable way. In the region of the support means 7 the vehicle has couplings 12 and 13 at the ends of conduits extending from the valve which communicates with the source of fluid under pressure, so that by way of the couplings 12 and 13 connections can quickly be made with the couplings 10 and 11 of the conduits 8 and 9, in order to enable the operator to quickly connect the lifting means 5 to a source of fluid under pressure.

FIG. 2 shows the parts where the vehicle 6 has been situated in a position close to the attachment 1. The support means 7 is still situated at a slight distance from the connecting means 3. The conduits 8 and 9 are respectively connected with the couplings 12 and 13. The lifting means 5 has been actuated to raise the connecting means 3 with the respect to the attachment 1 to the elevation shown in FIG. 2. The connecting means includes hooks 14 fixed to the plate 3 at the region of its upper edge, and it will be noted that when the parts have the position shown in FIG. 2 the hooks 14 are situated at an elevation higher than the upper edge of the support plate 7. This support plate 7 carries at its face which is directed away from the connecting means 3 centering elements 15 which together with the free ends of the hooks 14 form a centering means for centering the plate 3 with respect to the plate 7, and these elements 15 have upper open ends through which the free ends of the hooks 14 are adapted to pass downwardly into the elements 15.

In FIG. 3 the vehicle 6 is shown where it has been displaced through the slight additional distance beyond the position shown in FIG. 2 to a position where the front face of the plate 7 directly engages the rearwardly directed face of the plate 3, and the hooks 14 extend over the upper edge of the plate 7 into the receiving elements 15. Thus, after the parts have the position in FIG. 2, the vehicle 6 is advanced through a slight additional distance to place the plate 7 in engagement with the plate 3, and then the lifting means 5 is actuated to lower the plate 3 with respect to the plate 7 so that the hooks 14 extend over the top edge of the plate 7 into the receiving elements 15.

As is apparent from the drawings, the lifting means 5 includes a cylinder in which is located a piston having a piston rod extending upwardly beyond the cylinder. The top end of the piston rod is connected to the bar 4. As the piston is moved upwardly in the cylinder the piston rod moves out of the cylinder to raise the connecting means 3 with respect to the attachment 1 to the position shown in FIG. 2, whereupon the vehicle 6 is advanced to place the plate 7 in engagement with the plate 3. Then the piston is moved downwardly with respect to the cylinder so as to lower the hooks 14 onto the top edge of the plate 7 and into the receiving elements 15. When the plate 3 has thus been mounted on the plate 7, the piston cannot move downwardly any more, since its elevation is determined by the connection of the plate 3 with the plate 7, but the operation of the lifting means is continued at this time so that the cylinder 5 now moves upwardly with respect to the piston, thus raising the attachment 1 upwardly with respect to the connecting means 3 which is now carried by the support means 7. In this way the parts have been placed in the position shown in FIG. 3. The lifting means 5 may now be used in a conventional manner to raise and lower the attachment 1 to a selected elevation. Furthermore, once the plate 3 has been connected with the plate 7 by receiving of the hooks 14 in the receiving elements 15, the plates 3 and 7 can be rigidly fixed to each other by suitable wedges, bolts, or the like.

Figure 4:
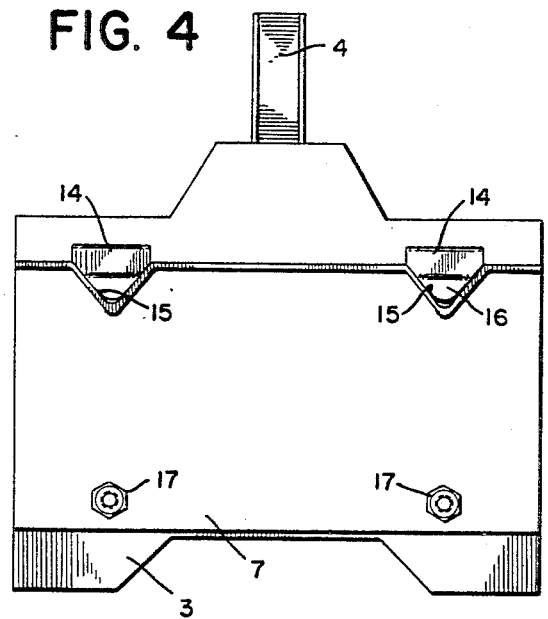
FIG. 4 is a side elevation of the support means of the invention as it appears when looking toward that face thereof which is directed rearwardly away from the attachment.

FIG. 4 shows at an enlarged scale, as compared to FIGS. 1-3, the plate 7 as it appears when looking toward the rearwardly directed surface thereof. This plate 7 which is fixedly carried by the vehicle has its front surface in engagement with the plate 3 which is shown in FIG. 4 projecting upwardly beyond and downwardly below the plate 7. As is apparent from FIG. 4, the hooks 14 have downwardly projecting free ends of tapered, substantially pointed or wedge-shaped configuration received in the receiving elements 15 which are of a corresponding configuration, in that these receiving elements 15 have open top ends and are downwardly tapered as indicated in FIG. 4. As a result the free ends of the hooks 14 coact with the elements 15 to form a centering means which centers the plate 3 with respect to the plate 7 during the downward movement of the plate 3 with respect to the plate 7 after the parts have the position shown in FIG. 2 and while the free ends of the hooks 14 move into the receiving elements 15. Suitable nuts 17 are fixed to the rearwardly directed surface of the plate 7, and bolts 18 which fixedly carry collars engaging the front surface of the plate 3 pass through aligned openings of the plates 3 and 7 threadedly into the nuts 17 for fixedly connecting the plates 3 and 7 to each other after the plate 3 has been mounted on the plate 7.

Figure 5:
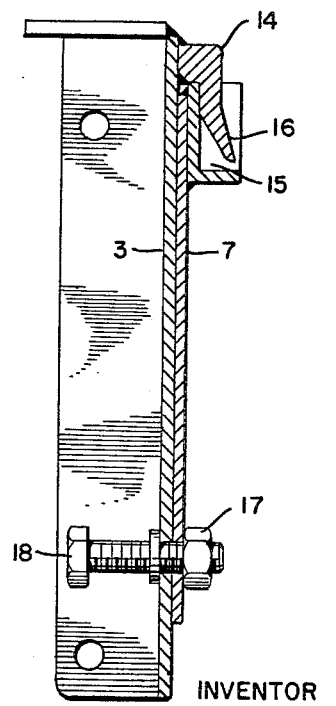
FIG. 5 is a partly sectional side view of the structure of FIG. 4 taken in a plane which passes vertically through a centering means and fixing means of the structure of the invention.

As is apparent from the side view of FIG. 5, the hooks 14 have free tapered ends 16 which not only match the configuration of the receiving elements 15, respectively, but which in addition are inclined rearwardly away from the plate 3 so that the free side surfaces of the tapered free end 16 can slidably engage the tapered inner side surfaces of the receiving elements 15 for efficiently centering the plate 3 with respect to the plate 7. Also it will be noted that FIG. 5 clearly illustrates the coaction beween the bolts 18 and the nuts 17.

Thus, with the method of the invention the vehicle will be brought into a position where the support means 7 is in close proximity to the connecting means 3, whereupon the lifting means 5 is actuated to raise the connecting means with respect to the attachment 1 and the support means 7 until the hooks of the connecting means are situated over the upper edge of the support means 7, whereupon the latter is advanced into engagement with the plate 3 which is now lowered so that the hooks will be received in and centered by the elements 15, during lowering of the connecting plate 3 by the lifting means 5. During the continued operation of the latter the attachment 1 will be raised.

It will be noted that the lifting means 5 is required in any event for operation of the attachment 1, so that with the structure of the invention use is made of structures which are in any event present in connection with the operations of the device. Thus, additional structure designed only for the purposes of attaching the attachment to the vehicle are not required. This lifting means can be hydraulically or pneumatically operated, as indicated above. However, it is also possible to use other lifting devices such as, for example, electrical or mechanical lifting devices. Furthermore, when certain lifting devices are of the single-acting type, then the lifting operations can be carried out in other ways, as, for example, by a mechanically or electrically actuated supporting spindle.

The disconnection of the attachment from the vehicle is brought about by lowering the attachment to the floor or ground by means of the lifting means 5. Then the fixing devices such as the wedges or the bolts 18 are disconnected, whereupon the lifting means is actuated so as to raise the connecting means 3 away from the support means 7, displacing the hooks out of the receiving elements 15. Finally the coupling connections at the conduits for the fluid under pressure are separated so that the attachment is separated from the source of fluid under pressure of the vehicle, and in this way the detachment of the attachment from the vehicle is completed.

Thus, it will be seen that with the method and apparatus of the invention the rapid connection and disconnection of the attachment to and from the vehicle, respectively, can be carried out by a single individual.

In connection with the centering means provided by the construction of the hooks 14 and the receptacles 15 therefor, it is possible to provide the free ends 16 of the hooks 14 with an inclination where instead of extending downwardly and rearwardly from the plate 3 they extend perpendicularly away from the latter.

While the above-described method and apparatus of the invention are particularly suitable for attaching a snowplow to a vehicle, it is of course to be understood that the method and apparatus of the invention are also capable of being used with advantage to connect and disconnect any other types of attachments to and from a vehicle, respectively.

What is claimed is:

1. For use with a vehicle, support means fixed to the vehicle, a completely separable attachment, connecting means coacting with said support means for connecting said attachment to said support means, movable guide means operatively connected to said attachment and to said connecting means for guiding the latter for elevational movement with respect to said attachment and for guiding said attachment for elevational movement with respect to said connecting means, centering means on said connecting means and support means adapted to coact when said connecting means is lowered into engagement with said support means, and lifting means mounted on said attachment and operatively connected to said connecting means for raising the latter with respect to said attachment to an operative position where said connecting means is carried by said support means and for then raising said attachment to a selected elevation with respect to said connecting means.

2. The combination of claim 1 and wherein said attachment is a snowplow.

3. The combination of claim 1 and wherein said connecting means hangs on said support means and is first raised into engagement with said support means and then lowered into said operative position with respect thereto.

4. For use with a vehicle, support means fixed to the vehicle, an attachment, connecting means coacting with said support means for connecting said attachment thereto, guide means operatively connected to said attachment and to said connecting means for guiding the latter for elevational movement with respect to said attachment and for guiding said attachment for elevational movement with respect to said connecting means, lifting means carried by said attachment and operatively connected to said connecting means for raising the latter with respect to said attachment to an operative position where said connecting means is carried by said support means and for then raising said attachment to a selected elevation with respect to said connecting means, said connecting means depending from said support means and being first raised into engagement with said support means and then lowered into said operative position with respect thereto, and centering means for centering said connecting means with respect to said support means during lowering of said connecting means to said operative position with respect to said support means, said centering means including downwardly tapered centering elements carried by said support means and having upper open ends, respectively, and hooks carried by said connecting means and having matching downwardly tapered ends respectively received in said elements carried by said support means.

5. The combination of claim 4 and wherein said ends of said hooks are inclined away from the said connecting means.

6. The combination of claim 4 and wherein said support means and said connecting means are both in the form of a pair of plates which engage each other in face-to-face relation when said connecting means is in said operative position thereof, and said hooks being carried by said connecting means adjacent an upper portion of said plate thereof and extending over an upper edge of said plate of said support means into the elements of said centering means which are carried by said support means, the latter elements being carried by a surface of said plate of said support means which is directed away from said plate of said connecting means when the latter is in said operative position with respect to said support means.

7. The combination of claim 1 and wherein said lifting means is a fluid-operated means operating with a pressure fluid.

8. The combination of claim 7 and wherein said guide means is a parallelogram linkage interconnecting said attachment and said connecting means with each other and said fluid-operated lifting means being pivotally carried by said linkage and having a pivotal connection with said connecting means.

9. The combination of claim 8 and wherein a source of fluid pressure is carried by the vehicle, a flexible conduit communicating with said source of fluid under pressure and provided with a coupling element at its terminus, and a second flexible conduit connected to said fluid-operated lifting means and also provided with a coupling element at its terminus which can be quickly connected with and detached from said coupling element of said conduit connected to said source of fluid under pressure, for establishing for said fluid-operated lifting means a connection to actuate the latter.

10. A method of connecting a separable attachment to a vehicle comprising the steps of moving the vehicle to a location where a support plate carried thereby is adjacent a connecting plate connected to the attachment, connecting a fluid-pressure lifting means which is carried by the attachment to a source of fluid under pressure mounted on the vehicle, actuating the lifting means to raise the connecting plate above the plane of said support plate and thereafter lower said connecting plate into an operative position in engagement with said connecting plate whereby the latter is carried by the support plate, and then actuating the lifting means to raise the attachment with respect to the connecting plate which is carried by the support plate.

References Cited
UNITED STATES PATENTS

| | | | |
|---|---|---|---|
| 2,231,875 | 2/1941 | Behnke et al. | 37—44 |
| 2,722,066 | 11/1955 | Wills et al. | 172—806 |
| 2,867,921 | 1/1959 | Brown | 172—801 |
| 3,233,350 | 2/1966 | Malzahn et al. | 37—42 |
| 3,400,475 | 9/1968 | Peitl | 37—42 |

ROBERT E. PULFREY, Primary Examiner

EUGENE H. EICKHOLT, Assistant Examiner

U.S. Cl. X.R.

172—273, 463